United States Patent Office 3,049,761
Patented Aug. 21, 1962

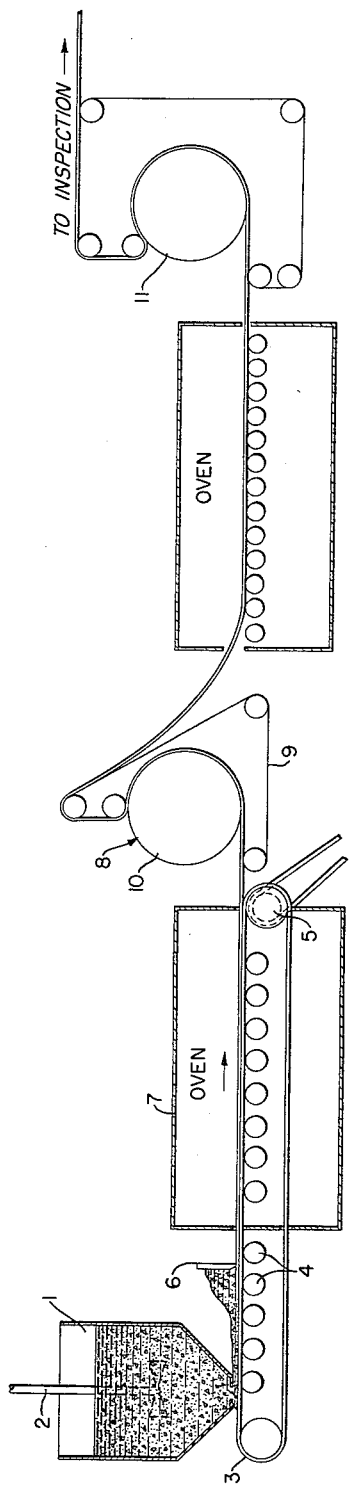

3,049,761
PROCESS FOR PRODUCING COLORED
SHEET MATERIAL
Michael A. Yakubik, Hudson, Ohio, assignor to The
Goodyear Tire & Rubber Company, Akron, Ohio, a
corporation of Ohio
Filed Mar. 7, 1956, Ser. No. 570,124
7 Claims. (Cl. 18—57)

This invention relates to a process for the production of sheet material and to the product produced thereby.

Multicolored sheeting has been produced heretofore by several different processes. One of these involves the milling of a thermoplastic resin of one color and adding to the resin while on a mill, just prior to removing it from the mill, strips or pieces of resin of a different color. This composite batch of resin is removed from the mill before the added strips or pieces are homogeneously blended with the original resin, and the mixture is then passed through a calender which presses the resin mixture into a sheet and distributes the coloring resin in streaks throughout a background of the base resin. Another method which has been used is to drop colored plastisol resin paste on a solid sheet of resin just before it enters a calender. This squeezes the plastisol paste into the base sheet while the heat from the calender fuses the paste and the base sheet together forming a composite product which may have several different colors.

It is an object of the present invention to provide a method of making a sheet of thermoplastic resin. It is another object of this invention to provide a method of producing a colored, and particularly a multicolored, thermoplastic resin sheet. It is another object of this invention to provide a method of producing a variegated sheet material suitable as a floor covering in which the pigmented particles have a sharp outline similar to that obtained in terrazzo tiles. It is another object of this invention to provide a method of producing a variegated sheet material suitable for floor covering and having a soft or "spatter" pattern in contrast to the sharply outlined particles of a terrazzo tile. Other objects will appear hereinafter as the description of the invention proceeds.

According to the present invention, sheet material is produced by forming a heat-gellable plastisol paste, mixing the paste with a particulate resin, spreading the mixture on a base and heating to gel the paste and set the mixture and then further heating and pressing to shape or mold the product.

According to one embodiment of this invention, the heat-gellable paste is mixed with the particulate resin, and the mixture is immediately spread on a base and heated to gel the paste and set the mixture and then further heated and pressed to mold the sheet. This method allows the particulate resin to maintain the sharp outline of the individual particles. When the paste and the particulate resin are of different colors, this produces a product which is similar in appearance to terrazzo tile.

In another embodiment of this invention, the heat-gellable plastisol paste is formed, mixed with the particulate resin, and the mixture is allowed to stand for a period of time sufficient for the particles of resin to absorb some of the plasticizer from the plastisol paste and become soft. This mixture of the plastisol paste and softened particulate resin is then spread on a base, heated to gel the paste and set the mixture and is then further heated and pressed. The final pressing operation causes the softened particles to become flattened, and when the paste and resin particles are of different colors, produces a pattern known in the flooring trade as a "spatter" pattern.

The process of this invention can be used to produce sheet material which is of one color throughout. It can also be used to produce sheet material which has one or more colors distributed in the base material. For example, to produce a sheet material which has only one color, a granulated resin is mixed with a plastisol paste having the same color. This mixture when spread and fused will produce a sheet of only one color. In another variation, as where it may be desired to produce a sheet having particles of one color embedded in a clear background, a granulated colored resin can be embedded in a clear plastisol paste. This will produce a sheet of a conglomerate material in which the colored resin particles are surrounded by the clear matrix formed from the clear plastisol paste.

In the preferred embodiment of this invention, granulated resin of various colors is mixed with a plastisol paste, and this mixture is then spread, or otherwise formed into a layer or sheet, fused and pressed. A multicolored sheet in which particles of various colors are distributed throughout the matrix is produced. The method can be used with this embodiment to produce either (a) the terrazzo or sharp pattern or (b) the spatter or variegated spotted pattern. Other variations of these embodiments will occur to those familiar with the art to produce various varicolored sheets.

The process of this invention is well adapted to be carried out in a batch process in which small amounts of resin may be formed into a sheet in a press. However, the most practical and most economical use of the process will be in a continuous process similar to the one illustrated below. For a better understanding of the invention, reference may be had to the accompanying drawing in which 1 is a mixing vessel in which a plastisol paste and granulated resin are mixed by means of a stirrer 2 and allowed to flow onto a moving continuous belt 3. The belt is supported by rollers 4 and driven by driving rolls 5. The belt with the mixture of paste and granules is moved forward to a distributing means such as doctor blade 6 which evenly distributes the mixture on the belt. Then the belt proceeds to oven 7 which is operated at a temperature sufficient to gel the plastisol and set or solidify the mixture. The solidified resin mixture is carried from the oven by the belt to the pressure stage 8 in which the material is pressed continuously to make it into a sheet of uniform thickness. The pressure stage comprises moving endless belt 9 which presses against a large rotating drum or roll 10 to maintain pressure on the advancing material. The sheet is taken from the pressure stage through a second oven which heats and fuses the sheet, and then it is advanced into the finishing stage 11 where it is again pressed to make the sheet of uniform thickness and to give it a smooth surface. The finishing stage is similar to the pressure stage and similarly comprises a moving endless belt pressing against a large rotating drum. The sheet, after passing through the finishing stage, can be rolled up into a roll or can be cut up to form tiles or other sheet articles.

The sheet material of this invention can be formed in one continuous self-supporting sheet as indicated in the above process, or it may be formed on a belt and then transferred to a suitable backing material. The backing material may be a thermoplastic resin, fabric, asphalt-impregnated paper or other suitable material. If desired, the sheet material may be formed directly on the backing material. This is accomplished by spreading the plastisol paste-granulated resin mixture directly on the backing material and passing the thus-coated backing material through the ovens and the pressure stages as in the above process.

The example above shows the application of pressure after the fusing operation by means of a moving endless belt pressing against a large moving roll. Other suitable methods well known in the art can also be used.

The plastisol paste is made according to well-known methods by mixing plasticizers (and stabilizers, coloring materials and other compounding ingredients, as desired) with a finely divided plastisol resin. Suitable resins known to be useful for this purpose are vinyl chloride resins such as polyvinyl chloride, vinyl chloride-vinyl acetate copolymer, vinyl chloride-diethyl maleate copolymer and other vinyl chloride copolymers, several of these being readily available articles of commerce. One vinyl chloride resin which is particularly suitable and readily obtainable is Pliovic AO sold by The Goodyear Tire & Rubber Company and identified as a vinyl chloride-diethyl maleate copolymer. Another suitable commercially obtainable plastisol resin is VYNV sold by Carbide and Carbon Chemicals Corporation and identified as a vinyl chloride-vinyl acetate copolymer. The finely divided vinyl chloride plastisol resin is mixed with a plasticizer or mixture of plasticizers such as dioctyl phthalate, dibutyl phthalate, tricresyl phosphate, and polymeric ester type plasticizers such as Paraplex G40 and Paraplex G60 (sold by Rohm and Haas Co. and identified as polymeric ester type plasticizers), or other suitable plasticizer or mixtures thereof in the proportions usually from 60 to 100 or more parts by weight of plasticizer to 100 parts by weight of the finely divided resin. The most suitable plasticizers are the esters of acids such as phthalic acid, adipic acid, sebacic acid, azelaic acid and phosphoric acid.

The particulate resin can be filled or unfilled and can be made by forming a plastisol paste, mixing the paste, if desired, with fillers or suitable pigments or other coloring materials, stabilizers and other compounding ingredients, as desired, and heating the paste to fuse it and cause the resin to absorb the plasticizer. The fused resin can then be broken up into particles by means of a cutting or shredding apparatus or a grinder such as a Wiley mill. Another method of making the particulate resin is to mix the resin with plasticizers, stabilizers, fillers or pigments or other coloring materials and other compounding ingredients, as desired, in a masticating apparatus such as a Banbury internal mixer or two-roll mill and then cut, shred, or grind the compounded resin into particles of a suitable size by means of equipment such as used with the fused plastisol resin above. In the process of this invention, it is preferred to form the granules by compounding in the Banbury internal mixer or the mill because more highly filled compounds can be made with less plasticizer than by the plastisol process and consequently a harder or firmer sheet material can be made when these particles are mixed with the plastisol paste and the mixture is fused. For applications such as floor covering where a hard, scratch-resistant, abrasion-resistant compositon is desired, the granular resin obtained from the Banbury internal mixer or the mill produces a highly satisfactory compound.

The size of the individual pieces of the particulate resin can be varied over a wide range. It is apparent that at least one dimension of the particles should not be substantially larger than the thickness of the sheet being made, so that the particles will not protrude unduly from the surface of the sheet. In practice, the particle size of the particulate resin will ordinarily be at least about 20 mesh, i.e., at least about 0.84 millimeter in average diameter. For sheets having relatively large designs or spots of color the pieces of particulate resin may be relatively large in one or two dimensions, but not substantially larger than the thickness of the sheet in the third dimension.

A sufficient amount of the plastisol resin-plasticizer mixture, i.e., the plastisol paste, must be present to form a matrix or cement to fuse and hold the particulate resin in sheet form. The minimum amount required will vary with the size and shape of the particulate resin particles. Otherwise, the proportion of plastisol paste to particulate resin will depend upon the desired appearance of the sheet material.

While certain representative embodiments and details have been shown for the purpose of illustrating the invention, it will be apparent to those skilled in this art that various changes and modifications may be made therein without departing from the spirit or scope of the invention.

I claim:

1. A process for the production of a terrazzo-tile-appearing vinyl sheet material which comprises casting a layer comprising a plurality of pigmented, sharply outlined vinyl resin particles having at least one dimension smaller than the thickness of said layer surrounded by a plastisol vinyl resin paste which can be heat-fused into a transparent mass and then heating the cast layer to fuse said plastisol paste into a matrix which holds said particles therein.

2. A process as claimed in claim 1 wherein said particles are larger in two dimensions than the thickness of said layer and smaller than the thickness of the layer in the third dimension.

3. A process for the production of a decorative vinyl resin sheet material which comprises casting a layer of a heat-fusible vinyl resin plastisol paste having distributed throughout said layer pigmented, sharply outlined vinyl resin particles surrounded by said paste, said particles having at least one dimension smaller than the thickness of said layer and having the same shape possessed at the time the particles were inserted in the plastisol and heating said layer to fuse said plastisol into a transparent matrix firmly holding said pigmented particles therein.

4. A process for the production of a decorative vinyl resin sheet material which comprises providing a heat-fusible vinyl resin unpigmented plastisol paste, adding pigmented, sharply outlined vinyl resin particles to said paste while retaining the sharp outline of the individual particles, said particles having at least one dimension smaller than the thickness of said sheet and being surrounded by said paste, casing the mixture of paste and particles into a layer wherein the particles are distributed throughout the layer and being surrounded by said paste and retaining the sharp outline possessed by the particles when added to said paste, and heating said layer to fuse said plastisol into a matrix firmly holding said pigmented particles therein.

5. A process for the production of a vinyl resin sheet material containing sharply outlined pigmented vinyl resin particles firmly held in and surrounded by a matrix of vinyl resin which comprises casting a layer of heat-fusible vinyl resin plastisol containing pigmented, sharply outlined vinyl resin particles having at least one dimension smaller than the thickness of said layer and wherein said particles are surrounded by said paste and heating said layer to fuse said plastisol into a matrix firmly holding said pigmented particles therein.

6. A process for the production of a vinyl resin sheet material which comprises casting a layer of a plastisol vinyl resin paste which can be heat-fused into a transparent mass and having embedded therein a plurality of pigmented, sharply outlined vinyl resin particles having at least one dimension smaller than the thickness of said layer and surrounded by said plastisol vinyl resin paste, and then heating the cast layer to fuse said plastisol paste into a transparent matrix which holds said particles therein.

7. A process for the production of a vinyl resin sheet material which comprises casting a layer of a plastisol vinyl resin paste which can be heat-fused into a solid mass and having embedded therein a plurality of pigmented, sharply outlined vinyl resin particles having at least one dimension smaller than the thickness of said layer and surrounded by said plastisol vinyl resin paste, heating the cast layer to fuse said plastisol paste into a matrix which holds said particles therein and then pressing the cast vinyl resin sheet.

References Cited in the file of this patent

UNITED STATES PATENTS

| | | |
|---|---|---|
| 1,898,515 | Albright | Feb. 21, 1933 |
| 2,154,438 | Conklin | Apr. 18, 1939 |
| 2,325,668 | Dreyfus | Aug. 3, 1943 |
| 2,393,843 | Cleef | Jan. 29, 1946 |
| 2,486,258 | Chavannes | Oct. 25, 1949 |
| 2,566,982 | Clemens et al. | Sept. 4, 1951 |